UNITED STATES PATENT OFFICE.

CHARLES M. STINE, OF WILMINGTON, DELAWARE, ASSIGNOR TO E. I. DU PONT DE NEMOURS AND COMPANY, OF WILMINGTON, DELAWARE, A CORPORATION OF DELAWARE.

METHOD OF PRODUCING EXPLOSIVE COMPOUNDS AND PRODUCT THEREOF.

1,311,926.  Specification of Letters Patent.  Patented Aug. 5, 1919.

No Drawing.  Application filed May 31, 1917. Serial No. 172,091.

*To all whom it may concern:*

Be it known that I, CHARLES M. STINE, of Wilmington, in the county of Newcastle, and in the State of Delaware, have invented a certain new and useful Improvement in Methods of Producing Explosive Compounds and Product Thereof, and do hereby declare that the following is a full, clear, and exact description thereof.

My invention relates particularly to a process for producing explosives of an advantageous character, and the product thereof. The object of my invention is to provide a process for producing explosives and particularly explosive compounds containing a nitro group and a nitrate group, or a plurality of such groups and a plurality of hydroxyl groups, and the product produced thereby. A further object of my invention is to provide compounds of this character in which a nitro group and a plurality of hydroxyl groups are located in the ring and a nitrate group is located in the side chain of the compound.

While my invention is capable of embodiment in many different forms, for the purposes of illustration I have described only certain forms thereof. For example, I may proceed as follows:

The compound produced in accordance with my process may be, for example, any one of the following:

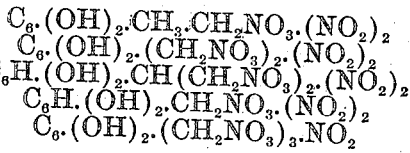

In carrying out my process toluol, xylol or higher homologues may be chlorinated at varying temperatures until at least two chlorin atoms are introduced into the phenyl nucleus, as well as at least one chlorin atom into a side chain the flow of chlorin being continued until a theoretical increase in weight has been attained corresponding to the tri-chlor derivative. Then the chlorinated mixture is nitrated by applying a mixture of nitric and sulfuric acids according to the procedure usually followed in nitration, preferably until the di-nitro compound is obtained. The nitrated material is heated with pure water under a pressure of preferably 20 pounds per square inch, until the chlorin atoms have been replaced by hydroxyl groups. The aqueous solution is then evaporated to drive off the water and hydrochloric acid, and the mixed alcohol is obtained. The mixed alcohol is nitrated further in the well known way, by the application of a mixture of sulphuric and nitric acids, resulting in the replacement of the hydroxyl group in the side chain by a nitrate group. The nitrated product may be separated from the mixed acids without previous drowning of the acids, or the mixture may be drowned (*i. e.*, diluted with cold water) in order to bring about the separation of the nitrated product, washed and neutralized; the nitrated product, after drying, is suitable for use as an explosive, or as an ingredient in explosives. The explosive thus obtained is exceedingly powerful and quite stable.

Such compounds may also be prepared by other processes, as, for example, a nitration of an aromatic hydrocarbon to the mono-or di-nitro compound, chlorination of the di-nitro compounds to introduce chlorin, hydrolysis of the chlor-nitro compound to produce a nitro hydroxyl compound and nitration of the nitro-hydroxyl compound to produce a nitro nitrate.

While I have described my invention above in detail, I wish it to be understood that many changes may be made therein without departing from the spirit of my invention. For example, I do not wish to limit myself to any particular method of preparation, and I wish it to be understood that the compounds produced in accordance with my invention may be used as such or in mixtures of various kinds, as desired.

I claim:

1. A process of producing an explosive compound which comprises nitrating and halogenating an organic compound containing side chains to introduce a nitro group and at least two halogen atoms into the phenyl nucleus, as well as at least one halogen atom into a side chain, hydrolyzing to substitute hydroxyl groups for the halogen atoms, and nitrating to substitute a nitrate group for the hydroxyl group in the side chain.

2. A process of producing an explosive compound which comprises nitrating and halogenating an aromatic hydrocarbon containing side chains to introduce a nitro group and at least two halogen atoms into the phenyl nucleus as well as at least one halogen atom into a side chain, hydrolyzing to substitute hydroxyl groups for the halogen atoms, and nitrating to substitute a nitrate group for the hydroxyl group in the side chain.

3. A process which comprises nitrating and halogenating an organic compound containing side chains to introduce a nitro group and at least two halogen atoms into the phenyl nucleus and a plurality of halogen atoms into the side chains, hydrolyzing to substitute hydroxyl groups for the halogen atoms, and nitrating to substitute nitrate groups for the hydroxyl groups in the side chains.

4. A process of producing an explosive compound which comprises nitrating and halogenating an aromatic hydrocarbon containing side chains to introduce a nitro group and at least two halogen atoms into the phenyl nucleus, as well as a plurality of halogen atoms into a side chain, hydrolyzing to substitute hydroxyl groups for the halogen atoms, and nitrating to substitute nitrate groups for the hydroxyl groups in the side chain.

5. A process which comprises nitrating and halogenating an organic compound containing side chains to introduce a plurality of nitro groups and at least two halogen atoms into the phenyl nucleus as well as a halogen atom into a side chain, hydrolyzing to substitute hydroxyl groups for the halogen atoms, and nitrating to substitute a nitrate group for the hydroxyl group in the side chain.

6. A process which comprises nitrating and halogenating a hydrocarbon containing side chains to introduce a plurality of nitro groups and at least two halogen atoms into the phenyl nucleus, as well as a halogen atom into a side chain, hydrolyzing to substitute hydroxyl groups for the halogen atoms, and nitrating to substitute a nitrate group for the hydroxyl group in the side chain.

7. A process which comprises nitrating and halogenating an aromatic hydrocarbon containing side chains to introduce a plurality of nitro groups and at least two halogen atoms into the phenyl nucleus, as well as a halogen atom into a side chain, hydrolyzing to substitute hydroxyl groups for the halogen atoms, and nitrating to substitute a nitrate group for the hydroxyl group in the side chain.

8. A process of producing an explosive compound which comprises nitrating and halogenating an organic compound containing side chains to introduce a nitro group and at least two halogen atoms into the phenyl nucleus, as well as at least one halogen atom into a side chain, hydrolyzing to substitute hydroxyl groups for the halogen atoms, and nitrating to substitute a nitrate group for the hydroxyl group in the side chain, the halogenation being carried out before the initial nitration.

9. A process of producing an explosive compound which comprises nitrating and halogenating an aromatic hydrocarbon containing side chains to introduce a nitro group and at least two halogen atoms into the phenyl nucleus, as well as at least one halogen atom into a side chain, hydrolyzing to substitute hydroxyl groups for the halogen atoms, and nitrating to substitute a nitrate group for the hydroxyl group in the side chain, the halogenation being carried out before the initial nitration.

10. A process which comprises nitrating and halogenating an organic compound containing side chains to introduce a nitro group and at least two halogen atoms into the phenyl nucleus and a plurality of halogen atoms into the side chains, hydrolyzing to substitute hydroxyl groups for the halogen atoms, and nitrating to substitute nitrate groups for the hydroxyl groups in the side chains, the halogenation being carried out before the initial nitration.

11. A process of producing an explosive compound which comprises nitrating and halogenating an aromatic hydrocarbon containing side chains to introduce a nitro group and at least two halogen atoms into the phenyl nucleus, as well as a plurality of halogen atoms into a side chain, hydrolyzing to substitute hydroxyl groups for the halogen atoms, and nitrating to substitute nitrate groups for the hydroxyl groups in the side chain, the halogenation being carried out before the initial nitration.

12. A process which comprises nitrating and halogenating an organic compound containing side chains to introduce a plurality of nitro groups and at least two halogen atoms into the phenyl nucleus, as well as a halogen atom into a side chain, hydrolyzing to substitute hydroxyl groups for the halogen atoms, and nitrating to substitute a nitrate group for the hydroxyl group in the side chain, the halogenation being carried out before the initial nitration.

13. A process which comprises nitrating and halogenating an aromatic hydrocarbon containing side chains to introduce a plurality of nitro groups and at least two halogen atoms into the phenyl nucleus, as well as a halogen atom into a side chain, hydrolyzing to substitute hydroxyl groups for the halogen atoms, and nitrating to substitute a nitrate group for the hydroxyl group in the side chain, the halogenation being carried out before the initial nitration.

14. An explosive comprising an organic compound of the aromatic series having therein a nitro group, at least two hydroxyl groups and a nitrate group, there being present at least three of said groups other than the hydroxyl groups.

15. An explosive comprising an organic compound of the aromatic series having a side chain, said compound having therein at least two hydroxyl groups, and having a plurality of nitro groups in the ring, and a plurality of nitrate groups in the side chain.

16. An explosive comprising an organic compound of the aromatic series having a side chain, said compound having therein at least two hydroxyl groups and having two nitro groups in the ring and two nitrate groups in the side chain.

17. An explosive comprising an organic compound having therein, at least two hydroxyl groups, and having a plurality of nitro groups and a plurality of nitrate groups.

18. An explosive comprising an organic compound of the aromatic series having therein at least two hydroxyl groups and having a plurality of nitro groups and a plurality of nitrate groups.

19. An explosive comprising an organic compound having therein, at least two hydroxyl groups, two nitro groups and two nitrate groups.

20. An explosive comprising an organic compound of the aromatic series having therein at least two hydroxyl groups, two nitro groups and two nitrate groups.

21. A composition comprising an organic compound having therein a nitro group, at least two hydroxyl groups and a nitrate group.

22. A composition comprising an organic compound of the aromatic series, having therein a nitro group, at least two hydroxyl groups and a nitrate group.

23. A composition comprising an organic compound having therein a nitro group, at least two hydroxyl groups and a nitrate group, there being present at least three of said groups other than the hydroxyl groups.

24. An organic compound of the aromatic series having the formula:

$$C_6 \cdot (OH)_2 \cdot (CH_2NO_3)_2 \cdot (NO_2)_2.$$

In testimony that I claim the foregoing I have hereunto set my hand.

CHARLES M. STINE.

Witnesses:
E. K. BOLTON,
P. E. STRICKLAND.